3,114,732
PROCESS FOR THE PRODUCTION OF POLYETHERS

Hanswilli von Brachel, Cologne-Sulz, and Günther Nischk and Richard Wegler, Leverkusen, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Jan. 21, 1959, Ser. No. 788,060
Claims priority, application Germany Feb. 4, 1958
4 Claims. (Cl. 260—52)

This invention relates to polyethers and, more particularly, to new and novel aromatic polyethers and a process for their manufacture.

Condensation products of formaldehyde and a member of the group consisting of aromatic hydrocarbons, phenol ethers, and halogen derivatives of aromatic hydrocarbons have heretofore been known. In these condensation products, the aromatic components are linked to each other by methylene, benzyl, formaldehyde acetal, and dibenzyl ether groups. It is known that these condensation products may be modified with polyhydric alcohols in the presence of an acid catalyst. Under these conditions, acetals of the polyhydric alcohols with a benzyl alcohol derived from the condensation product are formed in addition to free benzyl alcohol; and, if the condensation is allowed to continue, benzyl ethers and mixed benzyl glycol ethers may be formed. However, since these modified condensation products contain acetal groups, they are attacked by dilute acids and alkalis and hence are unsuitable for many technical applications.

It has also been known that the condensation products as above defined may be degraded in the presence of an acid catalyst, with monohydric alcohols of low molecular weight. As the degradation reaction proceeds, acetals and benzyl alcohol are formed and, finally, benzyl ethers and mixed alkyl benzyl ethers will be formed depending upon the monohydric alcohol employed. It is, therefore, possible to provide polyethers free of acetal groups from the low molecular weight degradation products, which contain benzyl ether groups and alkyl benzyl ether groups, by first removing the alkyl formals present in the equilibrium reaction mixture and then reacting the low molecular weight degradation products with a polyhydric alcohol.

It is an object of the invention to provide new and novel aromatic polyethers. It is another object of the invention to provide a process for the production of new and novel polyethers. It is still another object of the invention to provide polyethers free from acetal groups. A further object of the invention is to provide a process for the production of polyethers free of acetal groups. A still further object of the invention is to provide an improved process for the production of polyethers free of acetal groups.

The above objects and others are accomplished in accordance with the invention, generally speaking, by providing polyethers free of acetal groups by reacting a modified condensation product of formaldehyde and a member selected from the group consisting of an aromatic hydrocarbon, a phenol ether, and a halogen derivative of an aromatic hydrocarbon, with a polyhydric alcohol in the presence of a catalytic amount of an acid. The modified condensation product is obtained by heating the condensation product of formaldehyde and a member selected from the group consisting of an aromatic hydrocarbon, a phenol ether, and a halogen derivative of an aromatic hydrocarbon in the presence of an acid catalyst before it is reacted with the polyhydric alcohol. The treatment of the condensation product is continued until all formaldehyde which is formed is removed from the condensation product to provide a modified condensation product free of acetal groups. This modified product is then reacted with the polyhydric alcohol to form the polyether. Preferably, the process is carried out in vacuo or in the presence of an inert gas.

Any suitable acid catalyst may be used in accordance with the invention, such as, for example, p-tolylene sulphonic acid, p-tolylene sulphonic acid esters, benzene sulphonic acid, benzene sulphonic acid esters, phosphoric acid and their esters, zinc chloride, or acid activated bleaching earths and the like.

The term "condensation product," whenever used in the specification and claims, means the condensation product of formaldehyde with a member of the group consisting of an aromatic hydrocarbon, such as, xylene and the like, a phenol ether, such as, anisol and the like, and halogen derivatives of aromatic hydrocarbons, such as, dichlorobenzene and the like. Such condensation products are well known and are disclosed, for example, in Angew. Chemie, 1948, pages 88–96.

Any suitable polyhydric alcohol may be reacted with the modified condensation product in the presence of an acid catalyst to provide the novel polyethers of the invention. Suitable polyhydric alcohols are, for example, ethylene glycol, diethylene glycol, triethylene glycol, propylene glycol, 1,3-butanediol, 1,4-butanediol, 1,5-pentanediol, 1,6-hexanediol, dimethanol propane, trimethanol propane, hexanetriol, glycerine, pentaerythritol, mannitol, xylylene glycol, and polyalkylene ether glycols obtained by condensing alkylene oxides, such as, for example, ethylene oxide, propylene oxide, butylene oxide, amylene oxide, and the like. Moreover, the oxyalkylation product of the aforementioned polyhydric alcohols may be used in the process according to the invention in place of the polyhydric alcohol.

The process of the invention comprises reacting the modified condensation product free from acetal groups as hereinbefore defined with any suitable polyhydric alcohol at elevated temperatures and in the presence of a catalytic amount of an acid or a compound capable of giving rise to an acid under the reaction conditions. The temperatures of the reaction should exceed 80° C. and may be 200° C. and more. Preferably, the process is performed at a temperature of from about 140° C. to about 180° C. A suitable amount of an acid or a compound giving rise to an acid under reaction conditions is from about 0.01% to about 10%, and, preferably, from about 0.1% to about 5% by weight based upon a reaction mixture. Acidic compounds generally are suitable for use as catalysts, for example, mineral acids, such as, hydrochloric acid, and their derivatives, organic sulphonic acid, their esters and chlorides, boron fluorides, and acid activated bleaching earths, and the like.

The reaction is continued until the desired degree of condensation is attained. The progress of the condensation reaction is ascertained by measuring either the viscosity or the hydroxyl number of the reaction mass. Generally speaking, the reaction is continued until a polyether having a molecular weight of at least about 500 is obtained, and the condensation is discontinued before the hydroxyl number of the polyether becomes less than about 28.

By employing different reactants, or by varying the amounts of the reactants employed over wide limits, or by varying the condensation time, the condensation temperature, or even the amount of catalyst, it is possible to obtain polyethers which are free from acetal groups and in which their hydroxyl content, molecular weight, and degree of branching vary within wide limits. Generally speaking, however, it is preferred that by weight of the modified condensation product component to the polyhydric alcohol component comprise a ratio of from about 95% modified condensation product to about 5% polyhydric alcohol to a ratio of from about 5% modified condensation product to about 95% polyhydric alcohol.

The polyethers obtained are resistant to saponification, and because of their free hydroxyl groups, can be used as starting materials for the production of highly cross-linked plastics. For example, the polyethers may be reacted with organic polyisocyanates to provide cellular or non-cellular polyurethane plastics from which many useful articles may be made, such as, resilient rug underlay, and automobile tires.

The invention is further illustrated without limitation thereto by the following examples, the parts being by weight.

*Example 1*

About 3500 parts by weight of xylene-formaldehyde resin (oxygen content 10.9%) were heated with 11.5 parts by weight of p-tolylene sulphonic acid in vacuo at about 170° C. until no further formaldehyde was formed; that is, for approximately 10 hours. In this way, 3100–3200 parts by weight of a yellow brittle resin free from acetal groups were obtained.

About 5400 parts by weight of polyethylene oxide of molecular weight 560 and 60 parts by weight of p-tolylene sulphonic acid were added to 2800 parts by weight of the yellow brittle resin prepared as described above and the mixture was heated for 3½ to 4 hours in vacuo at about 170° C. 7940 parts by weight of an oil, which was miscible with cold water and which did not decompose, even after standing for several weeks at room temperature or after the aqueous solution had been heated for 48 hours, were thus obtained.

*Example 2*

About 300 parts by weight of the yellow brittle xylene-formaldehyde resin prepared as described in Example 1, about 120 parts by weight of trimethylol propane, and 0.5 part by weight of p-tolylene sulphonic acid were heated in a carbon dioxide atmosphere with stirring at about 170° C. until no more water distilled over. Heating was then continued for 2 hours under a pressure of 15 mm./Hg. The resultant product was a yellow resin with an OH number of about 280.

*Example 3*

About 300 parts by weight of the yellow brittle xylene-formaldehyde resin prepared as described in Example 1, about 90 parts by weight of trimethylol propane, about 40 parts by weight of 1,6-hexanediol, and 0.5 part by weight of p-tolylene sulphonic acid were reacted as described in Example 2. A resin which had an OH number of about 253 was obtained.

It is to be understood that any of the condensation products, polyhydric alcohols, or acid catalysts hereinbefore listed may be substituted for those nominated in any of the above examples if desired.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:
1. A process for the production of polyethers which comprises:
 (a) heating formaldehyde with a member selected from the group consisting of aromatic hydrocarbons, phenol ethers and halogen derivatives of aromatic hydrocarbons in the presence of an acidic catalyst to obtain a resinous condensation product, said acidic catalyst selected from the group consisting of (1) mineral acids, (2) organic sulfonic acids, (3) the esters and chlorides of said organic sulfonic acids, (4) boron fluorides and (5) acid activated bleaching earths;
 (b) continuing to heat said condensation product in the presence of said acidic catalyst until substantially no acetal groups are present; and
 (c) thereafter reacting said modified condensation product at a temperature of from about 80 to 200° C. with a polyhydric alcohol having from 2 to 6 —OH groups in the presence of said acidic catalyst.

2. A process for the production of polyethers which comprises:
 (a) heating formaldehyde with a member selected from the group consisting of aromatic hydrocarbons, phenol ethers and halogen derivatives of aromatic hydrocarbons in the presence of an acidic catalyst to obtain a resinous condensation product, said acidic catalyst selected from the group consisting of (1) mineral acids, (2) organic sulfonic acids, (3) the esters and chlorides of said organic sulfonic acids, (4) boron fluorides and (5) acid activated bleaching earths;
 (b) continuing to heat said condensation product in the presence of said acidic catalyst and in vacuo, removing substantially all the formaldehyde evolved to provide thereby a modified condensation product substantially free of acetal groups; and
 (c) thereafter reacting said modified condensation product at a temperature of from about 80 to 200° C. with a polyhydric alcohol having from 2 to 6 —OH groups in the presence of said acidic catalyst.

3. A process for the production of polyethers which comprises:
 (a) heating formaldehyde with a member selected from the group consisting of aromatic hydrocarbons, phenol ethers and halogen derivatives of aromatic hydrocarbons in the presence of from about 0.01% to about 10% of an acidic catalyst based on the weight of the reaction mixture to obtain a resinous condensation product, said catalyst selected from the group consisting of (1) mineral acids, (2) organic sulfonic acids, (3) the esters and chlorides of said organic sulfonic acids, (4) boron fluorides and (5) acid activated bleaching earths;
 (b) continuing to heat said condensation product in the presence of said acidic catalyst until substantially no acetal groups are present; and
 (c) thereafter reacting said modified condensation product at a temperature of from about 80 to 200° C. with a polyhydric alcohol having from 2 to 6 —OH groups in the presence of said acidic catalyst.

4. A process for the production of polyethers which comprises:
 (a) heating formaldehyde with a member selected from the group consisting of aromatic hydrocarbons, phenol ethers and halogen derivatives of aromatic hydrocarbons in the presence of an acidic catalyst to obtain a resinous condensation product, said acidic catalyst selected from the group consisting of (1) mineral acids, (2) organic sulfonic acids, (3) the esters and chlorides of said organic sulfonic acids, (4) boron fluorides and (5) acid activated bleaching earths;
 (b) continuing to heat said condensation product in the presence of said acidic catalyst until substantially no acetal groups are present; and
 (c) thereafter reacting said modified condensation product at a temperature of from about 80 to 200° C. with a polyhydric alcohol having from 2 to 6 —OH groups in the presence of said acidic catalyst until the molecular weight of said resulting polyether is at least about 500.

(References on following page)

References Cited in the file of this patent

UNITED STATES PATENTS

| | | |
|---|---|---|
| 2,139,369 | Kyrides | Dec. 6, 1938 |
| 2,147,547 | Reiff et al. | Feb. 14, 1939 |
| 2,200,762 | Anderson | May 14, 1940 |
| 2,350,230 | Harvey | May 30, 1944 |
| 2,454,541 | Bock et al. | Nov. 23, 1948 |
| 2,501,600 | Feasley | Mar. 21, 1950 |
| 2,568,313 | Woolhouse et al. | Sept. 18, 1951 |
| 2,749,327 | Martin | June 5, 1956 |
| 2,806,834 | Nischk et al. | Sept. 17, 1957 |
| 2,825,712 | Witzel | Mar. 4, 1958 |
| 2,954,360 | Krzikalla et al. | Sept. 27, 1960 |
| 2,957,851 | Fetterly | Oct. 25, 1960 |
| 2,958,676 | Krzikalla et al. | Nov. 1, 1960 |

FOREIGN PATENTS

| | | |
|---|---|---|
| 668,873 | Great Britain | Feb. 20, 1952 |
| 720,034 | Great Britain | Dec. 15, 1954 |
| 798,209 | Great Britain | July 16, 1958 |

OTHER REFERENCES

Wegler: Angewante Chemie, vol. 60, #4, pages 88–96 (1948). (Copy in Sci. Library.)